United States Patent
Church

(10) Patent No.: US 10,650,567 B2
(45) Date of Patent: May 12, 2020

(54) OPTIMIZING PROCESSING TIME OF A SIMULATION ENGINE

(71) Applicant: FlyInside, Inc., Troy, NY (US)

(72) Inventor: Daniel Church, Troy, NY (US)

(73) Assignee: FlyInside, Inc., Troy, NY (US)

( * ) Notice: Subject to any disclaimer, the term of this patent is extended or adjusted under 35 U.S.C. 154(b) by 0 days.

(21) Appl. No.: 16/003,859

(22) Filed: Jun. 8, 2018

(65) Prior Publication Data

US 2018/0357812 A1 Dec. 13, 2018

Related U.S. Application Data

(60) Provisional application No. 62/517,265, filed on Jun. 9, 2017.

(51) Int. Cl.
| | |
|---|---|
| *G06T 1/00* | (2006.01) |
| *G06T 15/00* | (2011.01) |
| *G06T 1/20* | (2006.01) |
| *G06T 1/60* | (2006.01) |
| *G06T 19/00* | (2011.01) |

(52) U.S. Cl.
CPC .............. *G06T 15/005* (2013.01); *G06T 1/20* (2013.01); *G06T 1/60* (2013.01); *G06T 19/006* (2013.01); *G06T 2200/28* (2013.01)

(58) Field of Classification Search
CPC ........ G06F 3/011; G06F 3/012; G06F 9/5038; G06F 2212/1041; G06F 17/5009; G06F 3/04812; G06F 9/505; G06T 19/006; G06T 15/04

See application file for complete search history.

(56) References Cited

U.S. PATENT DOCUMENTS

| | | | |
|---|---|---|---|
| 2010/0178644 A1* | 7/2010 | Meglan | G16H 50/50 434/267 |
| 2014/0078176 A1 | 3/2014 | Kim et al. | |
| 2015/0145887 A1 | 5/2015 | Forutanpour et al. | |
| 2016/0027214 A1 | 1/2016 | Memmott et al. | |

(Continued)

OTHER PUBLICATIONS

Church, Dan DCOC Oculus DK2 Support for Flight Simulator X Preview, Feb. 23, 2015.

(Continued)

*Primary Examiner* — Hau H Nguyen
(74) *Attorney, Agent, or Firm* — McInnes & McLane, LLP; Jodi-Ann McLane

(57) ABSTRACT

A method of optimizing a processing time of a simulation engine that executes to create a simulated experience for a user, includes the steps of identifying a number of components that comprise the simulated experience to be rendered for the user in a virtual reality environment; assigns execution of the plurality of components to at least two threads, where the at least two threads execute in parallel on a CPU to create the simulated experience, where the first thread processes a first portion of the components for components that require rapid execution to create a realistic experience within the simulated experience, and reduces a processing load of the first thread by assigning a second portion of the components to execute in a second thread, where the second portion requires less rapid execution than the first portion to create the realistic experience.

20 Claims, 23 Drawing Sheets
(6 of 23 Drawing Sheet(s) Filed in Color)

(56) References Cited

U.S. PATENT DOCUMENTS

| | | | |
|---|---|---|---|
| 2016/0062540 A1 | 3/2016 | Yang et al. | |
| 2017/0003764 A1* | 1/2017 | Li | G06T 19/006 |
| 2018/0286053 A1* | 10/2018 | Labbe | G06T 7/194 |
| 2018/0302569 A1* | 10/2018 | Cabral | H04N 13/178 |

OTHER PUBLICATIONS

Church, Dan "DCOC v2 Prepar3D with Oculus Rift DK2, now improved!", https://www.youtube.com/watch?v=VZj0PUDC--8, Sep. 19, 2014.

Church, Dan "FlyInside FSX—Using Flight Simulator X in the Oculus Rift DK2, new features!", https://www.youtube.com/watch?v=VZj0PUDC-8, Mar. 11, 2015.

Church, Daniel, "FlyInside FSX Virtual Desktop + Leap Motion Demo," youtube, Jul. 27, 2015, 5 pages, XP054977323, Retrieved from the Internet: URL:https://youtu.be/TXnu39EzmzY?t=31s (Retrieved on May 9, 2017).

Godin, Guy "Virtual Desktop Tech Demo", https://www.youtube.com/watch?v=JynN5mmZ0KQ, Sep. 9, 2014.

International Preliminary Report on Patentability for PCT/US2017/021337 dated Sep. 11, 2018, 10 pages.

International Search Report for corresponding PCT Application No. PCT/US2017/021337, dated May 18, 2017, 6 pages.

Mdbuehler: "Real life flying vs Virtual Reality—Oculus Rift DK2/FSX 1 FlyInside FSX," youtube, Sep. 13, 2015, 4 pages, XP054977338, Retrieved from the Internet, URL:https://youtu.be/30pSJ0wOB6U?t=54s, (retrieved on May 10, 2017).

Non-Final Office Action in U.S. Appl. No. 15/453,264 dated Jul. 8, 2019.

Written Opinion for PCT/US2017/021337 dated May 18, 2017, 9 pages.

Church, Daniel, "DCOC v2 Prepar3D with Oculus Rift DK2, now improved!", https://www.youtube.com/watch?v=Kc7LOAeL45Y, Sep. 19, 2014.

Church, Daniel, "Kickstarter Project: FlyInside FSX ," Jun. 30, 2015, 18 pages, Retrieved from the Internet: URL: www.kickstarter.com/projects/1232710074/flyinside-fsx (Retrieved Sep. 3, 2019).

* cited by examiner

OPTIMIZING PROCESSING TIME OF A SIMULATION ENGINE

CROSS-REFERENCE TO RELATED APPLICATION

This patent document claims priority to earlier filed U.S. Provisional Application Ser. No. 62/517,265, filed on Jun. 9, 2017, the entire contents of which are incorporated herein by reference.

TECHNICAL FIELD

The present patent documents relates generally to virtual reality and more particularly to a method of rendering simulated environments in a virtual reality environment with improved use of system resources, enhancing the operation of the computing system.

BACKGROUND

Software applications, for example, such as virtual reality applications, may display an instance of the virtual reality application within a virtual reality headset. Software applications such as gaming applications may display an instance of the gaming application on a monitor. Virtual reality and/or gaming software applications are popular because they provide the user with a realistic environment in which a user, experiencing execution of the software application within the virtual reality headset, and/or displayed on a computer monitor, may interact in a seemingly real or physical way. Providing a realistic experience requires several different graphical components that execute, and at times, interact with each other. Each of the graphical components may require large amounts of computer processing that may overwhelm the resources of a computer system, causing the graphical components to execute slower than desired. A virtual reality and/or gaming software application typically can only execute as fast as its slowest component. A virtual reality and/or gaming software application that appears slow and/or choppy fails to provide a realistic experience for the user.

SUMMARY

Therefore, it would be helpful to optimize the processing time of a simulation engine to minimize the overall latency effect of graphical components of the virtual reality and/or gaming software application. According to one embodiment disclosed herein, in a method for optimizing a processing time of a simulation engine that executes to create a simulated experience for a user, the method identifies a plurality of components that comprise the simulated experience. The simulated experience is rendered for the user in a virtual reality headset and/or a computer monitor. The method assigns execution of the plurality of components to at least two threads. Each of the plurality of components is assigned to one of the two or more threads. The two or more threads execute in parallel on a Central Processing Unit (CPU) to create the simulated experience. The method executes a first portion of the plurality of components in a first thread of the two or more threads. The first portion represents graphics specific components that require rapid execution to create a realistic experience within the simulated experience. The first thread generates graphics commands for the GPU to maximize utilization of the GPU. The method reduces a processing load of the first thread by assigning a second portion of the plurality of components to execute in at least a second thread of the two or more threads, where the second portion requires less rapid execution than the first portion to create the realistic experience.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Various aspects of at least one embodiment are discussed below with reference to the accompanying figures, which are not necessarily drawn to scale, emphasis instead being placed upon illustrating the principles disclosed herein. The figures are included to provide an illustration and a further understanding of the various aspects and embodiments, and are incorporated in and constitute a part of this specification, but are not intended as a definition of the limits of any particular embodiment. The figures, together with the remainder of the specification, serve only to explain principles and operations of the described and claimed aspects and embodiments, but are not to be construed as limiting embodiments. In the figures, each identical or nearly identical component that is illustrated in various figures is represented by a like numeral. For purposes of clarity, not every component may be labeled in every figure.

FIG. 8A is a diagram of flight dynamics being partially processed in a graphics engine thread and a gauges thread according to methods disclosed herein;

DETAILED DESCRIPTION OF THE ILLUSTRATIVE EMBODIMENTS

Figure 1:
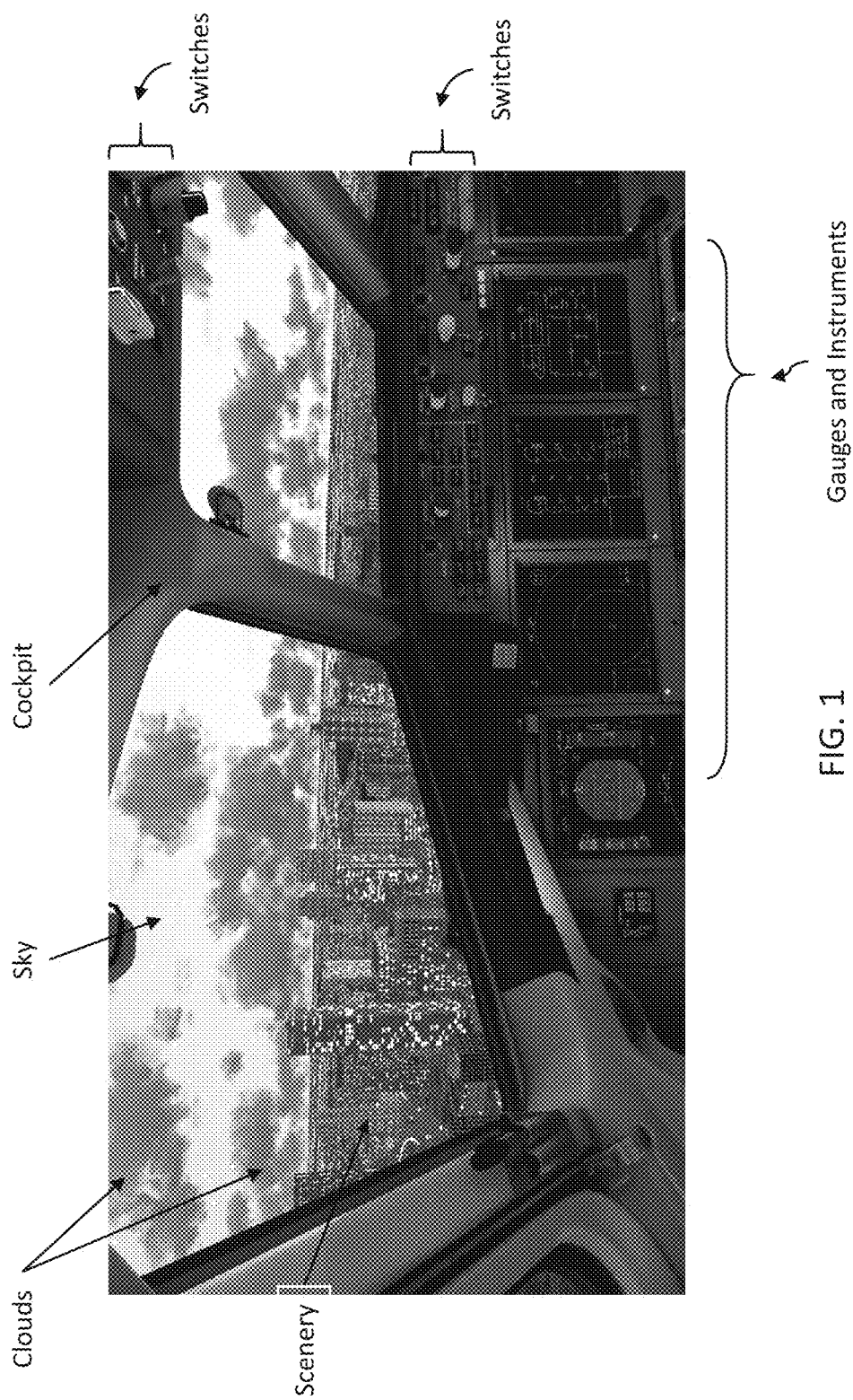
FIG. 1 is an exemplary display of a simulated environment for a virtual reality system.

Embodiments disclosed herein provide a method for optimizing processing time in a simulation engine for a virtual reality environment. The following description is presented to enable one of ordinary skill in the art to make and use embodiments disclosed herein, and are provided in the context of a patent application and its requirements. Various modifications to the embodiment will be readily apparent to those skilled in the art and the generic principles herein may be applied to other embodiments. Thus, embodiments disclosed herein are not intended to be limited to the embodiment shown but is to be accorded the widest scope consistent with the principles and features described herein. The examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting.

Embodiments disclosed herein can take the form of an entirely hardware embodiment, an entirely software embodiment or an embodiment containing both hardware and software elements. In a preferred embodiment, embodiments disclosed herein are implemented in software, which includes but is not limited to firmware, resident software, microcode, etc.

Furthermore, embodiments disclosed herein can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, point devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The flowchart and block diagrams in the Figures illustrate the architecture, functionality, and operation of possible implementations of systems, methods and computer program products according to various embodiments disclosed herein. In this regard, each block in the flowchart or block diagrams may represent a module, segment, or portion of code, which comprises one or more executable instructions for implementing the specified local function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The examples of the methods and systems discussed herein are not limited in application to the details of construction and the arrangement of components set forth in the following description or illustrated in the accompanying drawings. It will be understood to one of skill in the art that the methods and systems are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

Referring to FIG. 1, virtual reality software applications display an instance of the virtual reality application executing within a virtual reality headset and/or displayed on a computer monitor. Gaming software applications display an instance of the gaming application executing on a computer monitor. Virtual reality and/or gaming applications are comprised of multiple components that are executed one after another. There may be components that handle the background scenery, components that handle responding to user actions, etc. For example, in a flight simulation virtual reality application, there may be components that calculate aerodynamics and avionics (these calculations can take a long time on complicated aircrafts), components that handle and respond to user interactions with the controls in the cockpit, components that handle displaying the interior of the cockpit, components that handle displaying the scenery outside the cockpit such as vehicles driving on the roads below, etc. Typically, virtual reality and/or gaming applications execute in one thread, restricting all the processes to run at the same rate. There are multiple components that are executed one after the other. Some of the components may execute slowly, delaying execution of the other components. Some of the components may need to run faster than others for the virtual reality and/or gaming experience to appear realistic to the user. However, the speed at which the virtual reality and/or gaming application execute may be slowed down to the rate of its slowest running component. This slowed rate may result in a choppy experience for the user, and may slow the overall speed of the application.

Figure 2:
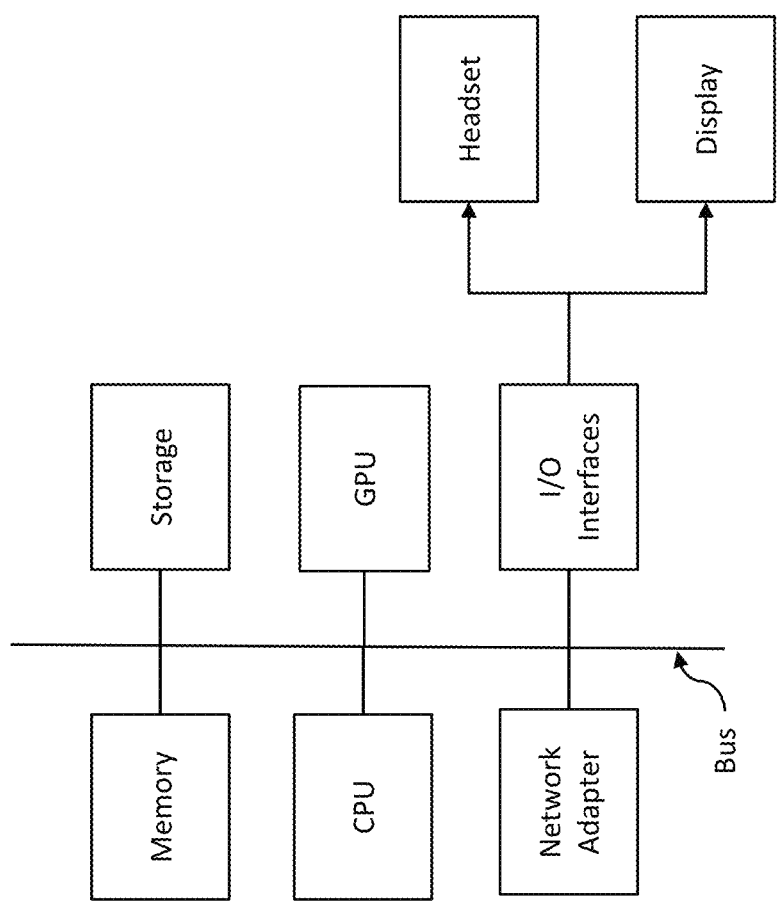
FIG. 2 is a diagram of a computing system for generating a simulated environment in a virtual reality system.

Referring to FIG. 2, when a virtual reality and/or gaming application is executing, some of the components are executing on the central processing unit (CPU) that resides on the motherboard, and some of the components are executing on the graphics processing unit (GPU) that resides on the graphics card. The CPU sends the graphics components to the GPU for execution. A graphics engine draws graphics on the computer display screen. As noted above, the drawing of the graphics within a virtual reality and/or gaming application needs to be fast and needs to rendered smoothly (for example, when a user turns his/her head within the virtual reality headset) so as not to appear choppy. Additionally, if the refresh rate is slower than the processing rate of the user's brain, the virtual reality experience may give the user the feeling of motion sickness. The exemplary computing system may also include a memory, and a bus that couples various system components, including the memory to the CPU and GPU. The bus represents one or more of any of several types of bus structure, including a memory bus or with one or more external devices, such as a display or headset, and other I/O interfaces. The memory may include computer readable media in the form of volatile memory, such as random access memory (RAM) or cache memory, or non-volatile storage media, such as hard discs and flash drives. The memory may include at least one program product having a set of at least one program code modules that are configured to carry out the functions of embodiments of the present invention when executed by the CPU and/or GPU. The computer system may communicate with one or more networks via a network adapter. The computer system may communicate with one or more databases via the network adapter or on the storage.

As noted above, generally, the virtual reality and/or gaming application runs on the CPU, and the CPU sends components of the virtual reality and/or gaming application that require graphics specific code to the GPU for execution by the graphics engine. For example, the CPU sends a program for example, a Shader program, to the graphics card to use for drawing triangles, and will also send information associated with drawing the triangles. The CPU will then instruct the GPU to draw the triangles. However, the CPU may be calculating, for example, avionics while the GPU is waiting for this transmission of information. This typically results in CPU utilization of nearly 100% while the GPU is only being utilized at a much lower percentage. Thus, the virtual reality application could be processing more graphics code on the GPU if it weren't for the bottleneck at the CPU. Meanwhile, the GPU is sitting idle waiting for the next transmission, by the CPU, of graphics components for the GPU to process. For example, the CPU processor may be operating at 100%, yet only producing 15 frames/second while the graphics card capabilities are being wasted.

The virtual reality and/or gaming application could be drawing more graphics, yet still executing just as fast if it weren't for the bottleneck at the CPU.

Figure 3:
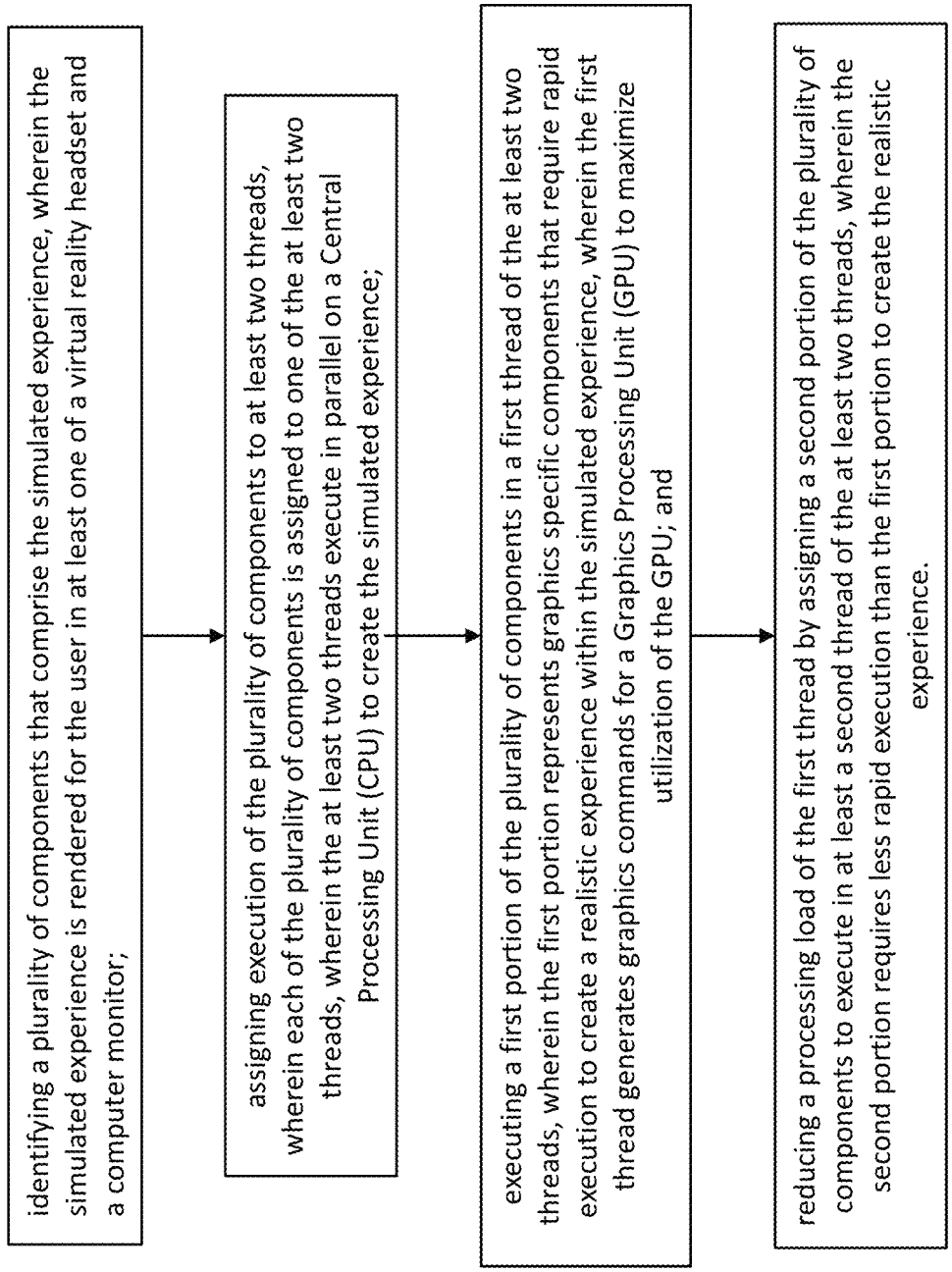
FIG. 3 is a flowchart of a method of for optimizing processing time in a simulation engine for a virtual reality environment.

Accordingly, as illustrated in FIG. 3, a method of optimizing the processing time in a simulation engine is shown generally. As will be explained in the example embodiments below, the method generally includes the steps of identifying a plurality of components that comprise the simulated experience, wherein the simulated experience is rendered for the user in at least one of a virtual reality headset and a computer monitor; assigning execution of the plurality of components to at least two threads, wherein each of the plurality of components is assigned to one of the at least two threads, wherein the at least two threads execute in parallel on a Central Processing Unit (CPU) to create the simulated experience; executing a first portion of the plurality of components in a first thread of the at least two threads, wherein the first portion represents graphics specific components that require rapid execution to create a realistic experience within the simulated experience, wherein the first thread generates graphics commands for a Graphics Processing Unit (GPU) to maximize utilization of the GPU; and reducing a processing load of the first thread by assigning a second portion of the plurality of components to execute in at least a second thread of the at least two threads, wherein the second portion requires less rapid execution than the first portion to create the realistic experience.

In an example embodiment, the simulation engine optimizing process executes the graphics engine in a graphics engine thread. The graphics engine thread executes on the CPU, processing graphics components to be sent to the GPU to more fully utilize the GPU. Thus, the separate graphics engine thread devoted to graphics components bypasses the bottleneck at the CPU. The graphics engine thread runs constantly sending graphic card commands to draw elements of the virtual reality environment. This produces a smooth frame rate, while better utilizing the graphics card's capacity. For example, the graphics card may be drawing as many of the graphics components as possible, producing 60-90 frames/second. The simulation engine optimizing process also determines whether and when to perform updates to the reality environment (i.e., the virtual reality environment and/or the gaming environment). For example, there may be no need to draw new graphics if nothing in the reality environment has moved. A reality environment may be, for example, a flight simulator. In this example embodiment, the simulation engine optimizing process may perform a light aerodynamics update, performing light calculations, rather than a full update. In an example embodiment, continuing with the flight simulator example, an avionics thread is running in parallel to the graphics engine thread. The avionics thread processes all the avionics and gauges, performing calculations and updates. In an example embodiment, the avionics thread may only produce 30-40 frames/second due to the heavy calculations required. A user is less likely to notice this latency. For example, if an altimeter needle does not move quickly, this is less noticeable to a user than if an aircraft is performing a barrel roll, and the reality environment reacts slowly. In an example embodiment, the simulation engine optimizing process offloads the avionics processing to the avionics thread. Whenever the graphics engine draws avionics, it uses the most recent avionics information that is available from the avionics thread.

Typically, when drawing graphics, the GPU draws the graphics three dimensionally using triangles, and then layers other graphics on top, for example, textures. In an example embodiment, the avionics thread paints the avionics to the texture to change the context of the texture. The graphics thread then reads from the texture to display it on the screen. The graphics thread uses those textures to color/create the components to make them appear three-dimensional in the reality environment. The avionics thread, however, cannot write to the texture when the graphics thread is using the texture to draw a component within the reality environment. To avoid these types of clashes between the avionics thread drawing the textures, and the graphics thread reading the textures, a triple buffering technique is used, which is generally illustrated in FIGS. 4A-4B, and 5A-5C. To avoid a scenario where the avionics thread would have to wait for the graphics thread to finish drawing the texture (and the graphics thread is constantly drawing a texture, or some other component of the reality environment), or where the graphics thread would have to wait for the avionics thread to finish writing to the texture, the simulation engine optimizing process maintains three copies of the texture. The graphics thread reads from one copy of the texture. The avionics thread can write to either one of the other two copies of the texture. There is one copy of the texture that was just written to, and one copy of the texture that is currently being written to. When the graphics thread wants to draw, it looks for the most recent copy of the texture, and reads from that copy of the texture. Thus, the graphics thread obtains the freshest update from avionics thread without having to wait for the avionics thread to finish writing to a copy of the texture. The avionics thread, whenever it finishes writing to a copy of the texture, looks for the other two copies of textures (that the graphics isn't currently reading from) to write to one of those copies of textures. Thus, the avionics thread and the graphics thread never have to wait for the other thread to finish reading from or writing to a copy of the texture because there's always a different copy of the texture available to read from or write to.

Figure 4B:
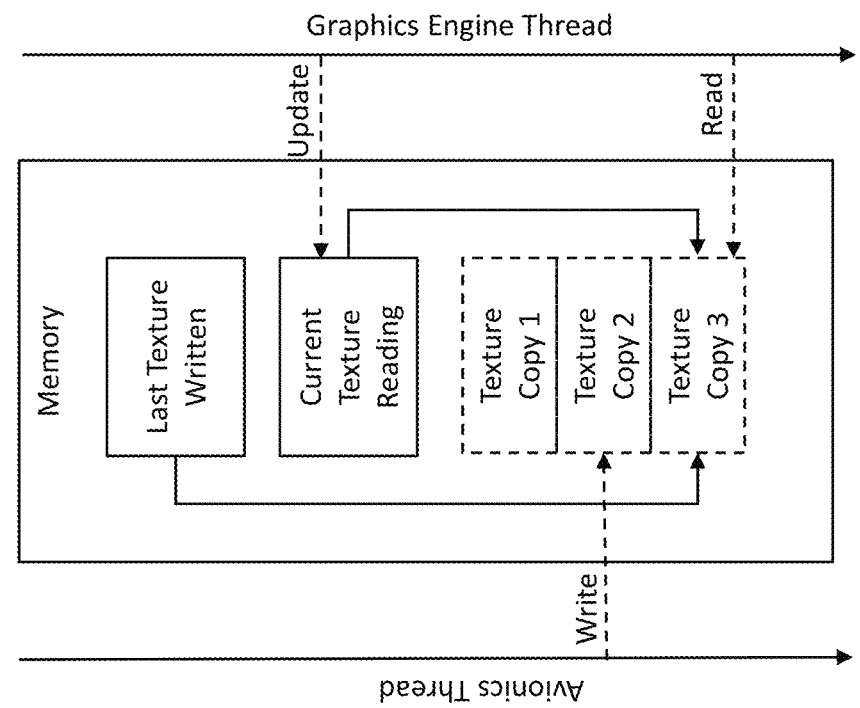
FIGS. 4A-4B are diagrams of a method of using a triple buffer technique to draw avionics textures according to the method disclosed herein.
Figure 4A:
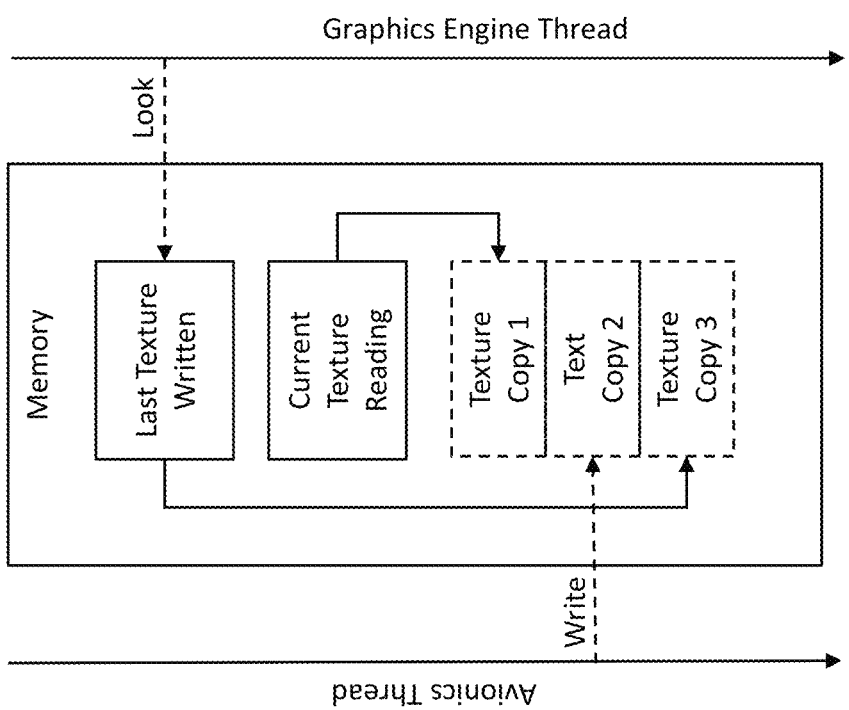
Figure 5B:
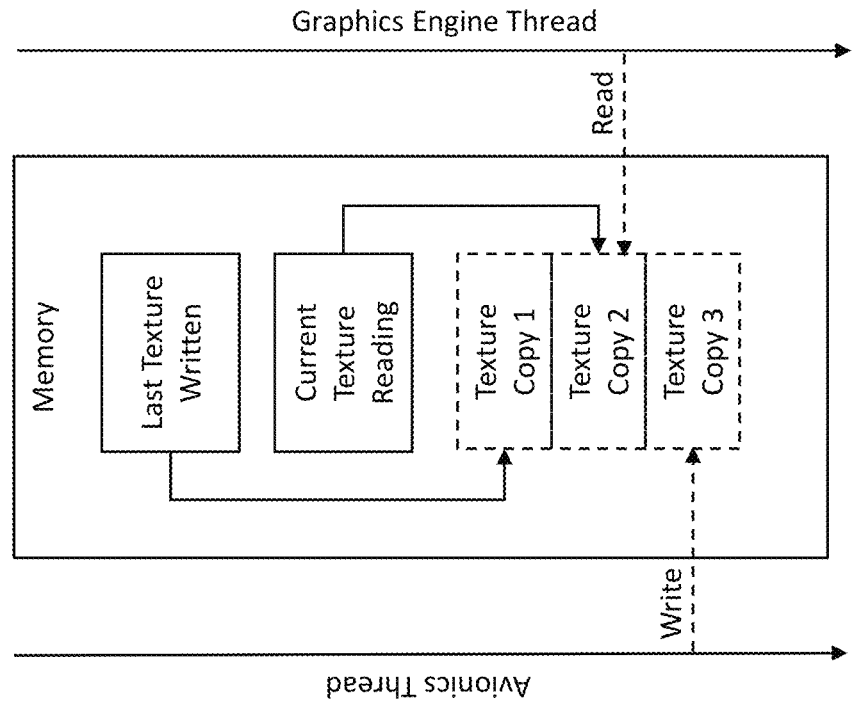
FIGS. 5A-5C are diagrams of a method of using a triple buffer technique to update avionics textures according to the methods disclosed herein.
Figure 5A:
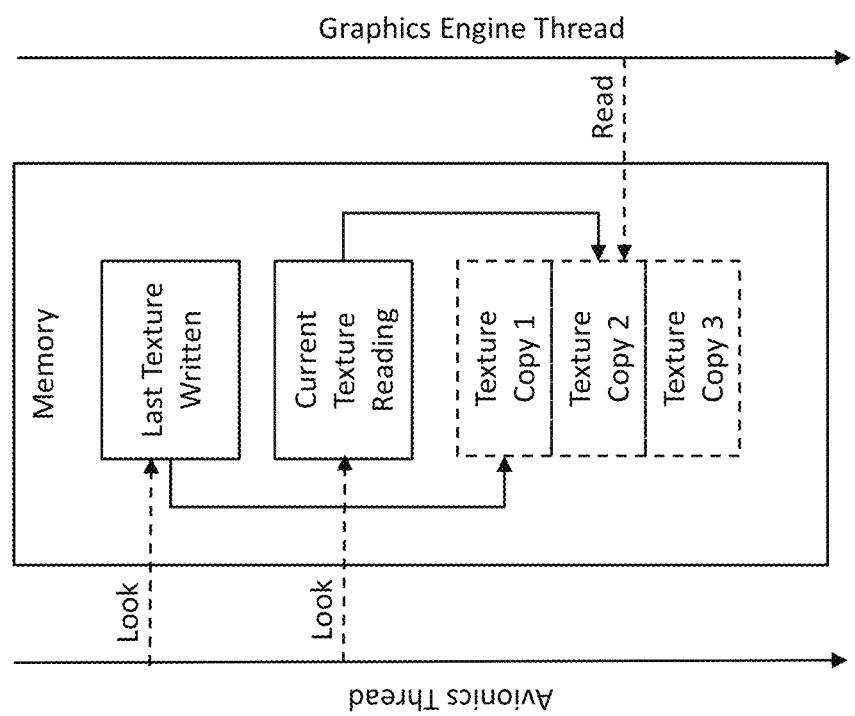
Figure 5C:
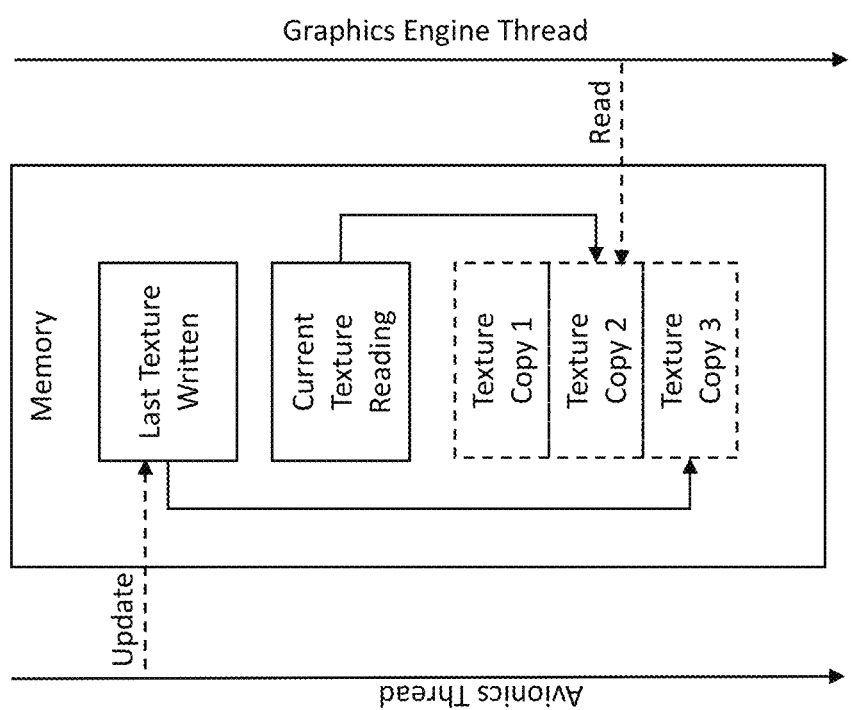

In an example embodiment, to keep all three copies of the texture in sync, there are two variables; LastTextureWritten and CurrentTextureReading. Whenever the graphics thread is requesting a new copy of the texture, it looks for the copy of the texture associated with the LastTextureWritten variable, as illustrated in FIG. 4A. The copy of the texture associated with the LastTextureWritten variable is then associated with the CurrentTextureReading variable, and the graphics thread reads from the copy of the texture associated with the CurrentTextureReading variable as illustrated in FIG. 4B. The three copies of the texture are the last written texture, the texture that's currently being read, and the texture that was most recently read from. When the avionics thread needs to choose a copy of the texture to write to, it chooses whichever copy of the texture that is not associated with the LastTextureWritten variable, or the CurrentTextureReading variable as shown in FIGS. 5A and 5B. Once the avionics thread writes to that third remaining copy of the texture, that copy of the texture becomes associated with the LastTextureWritten variable, as shown in FIG. 5C.

Figure 6:
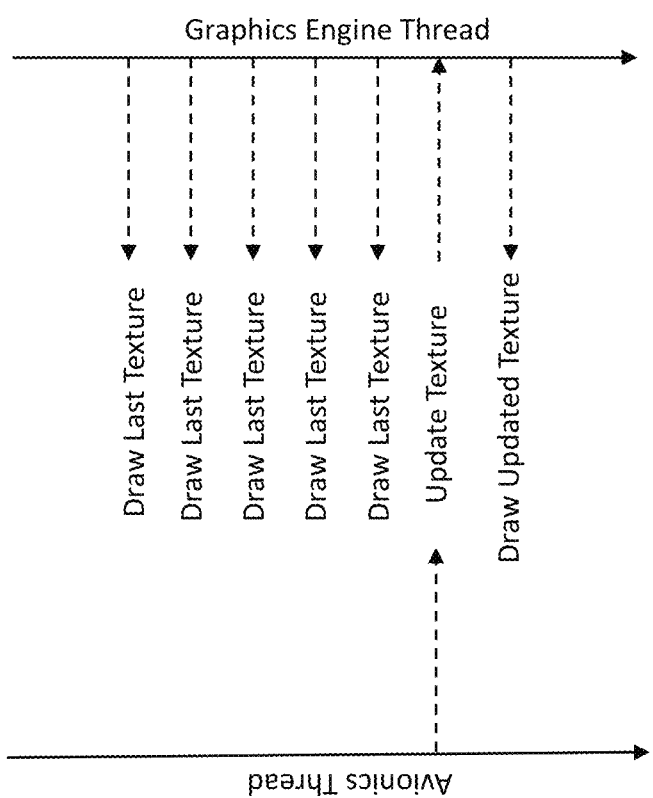
FIG. 6 is a diagram of a multiple threads running in parallel, but at different speeds according to the methods disclosed herein.

In an example embodiment, the graphics thread and the avionics thread are not updated in lockstep shown generally at FIG. 6. They each run at their own rate. For example, the avionics thread takes 50 milliseconds to write out a texture to update the avionics, whereas the graphics thread only takes 10 milliseconds to draw a graphics frame. This means that 5 times in a row, the graphics thread could draw the same texture (i.e., the copy of the texture associated with the LastTextureWritten variable) before the avionics thread updates the copy of the texture. Instead, the avionics thread writes to one of the three copies of the texture, and then informs the graphics thread that a copy of the texture is associated with the LastTextureWritten variable. In an example embodiment, the graphics thread won't use that copy of the texture until the graphics thread is ready to draw that texture. In an example embodiment, the two variables LastTextureWritten and CurrentTextureReading are read from and written to by two different threads. In an example embodiment, a mutex may be used for synchronization.

Figure 7A:
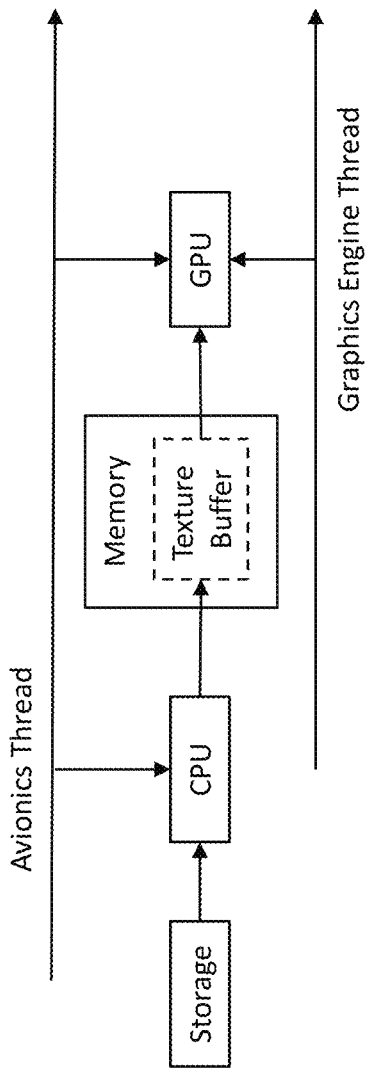
FIG. 7A is a diagram of an avionics thread using a CPU to compose a texture and instructing graphics engine thread to user the GPU to draw the avionics textures according to the methods disclosed herein.
Figure 7B:
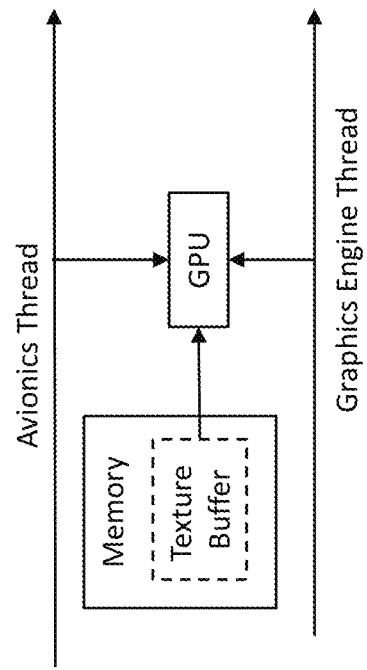
FIG. 7B is a diagram of an avionics thread using a GPU to compose a texture and instructing graphics engine thread to draw the avionics textures using the GPU according to the methods disclosed herein.

In an example embodiment, the avionics thread runs at its own rate. When the avionics thread writes to a copy of the texture, the avionics thread composes an image on the CPU, and then sends the image to the GPU to write it to the copy of the texture (see FIG. 7A). In another example embodiment, the avionics thread performs the image composition directly on the GPU (i.e., without having to transfer the image from the CPU to the GPU) (see FIG. 7B.

Figure 8A:
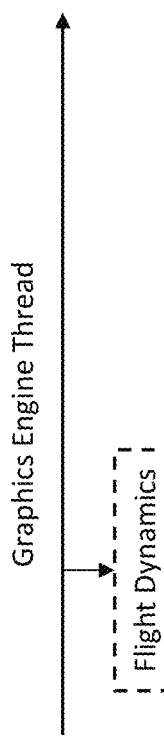
FIG. 8A is a diagram of flight dynamics being partially processed in a graphics engine thread according to the methods disclosed herein.
Figure 8B:
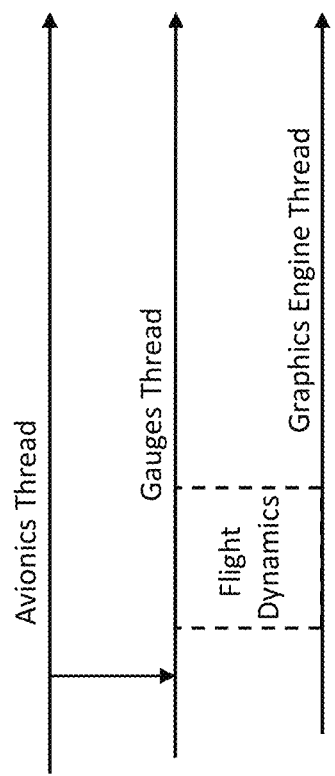
Figure 9A:
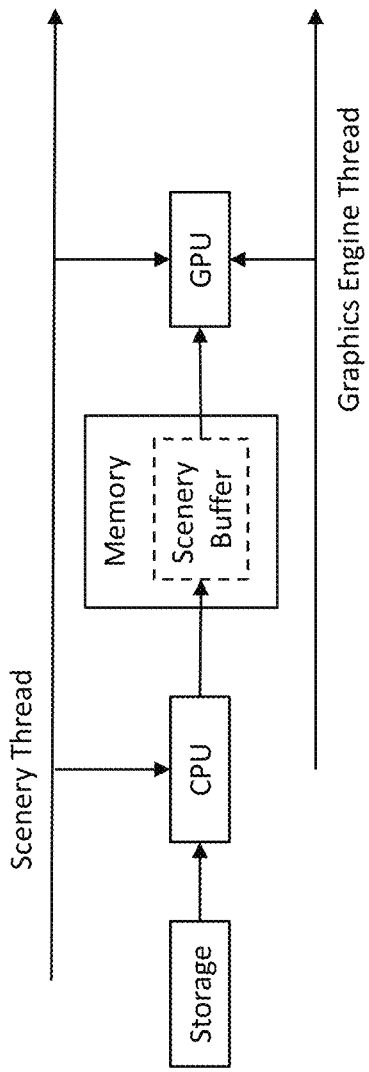
FIG. 9A is a diagram of a scenery thread using a CPU to compose scenery and instructing graphics engine thread to draw the scenery textures with a GPU according to the methods disclosed herein.

In an example embodiment, using a flight simulator as an example, the flight dynamics are run partially in the graphics thread to ensure the motion runs smoothly and appears real (See FIG. 8A). In another example embodiment, some of the complexity that affect flight dynamics are computed in a gauges thread because they are driven by avionics (See FIG. 8B). In an example embodiment, the process of loading the scenery associated with the reality application is handled within a scenery thread (as shown in FIG. 9A). Using the example of a flight simulator virtual reality environment, as the user is flying around the world within the virtual cockpit, the simulation engine optimizing process determines what areas of the world the user is approaching. In an example embodiment, the simulation engine optimizing process loads the data associated with those areas from a hard drive into system memory using the CPU. The simulation engine optimizing process performs transformations on the data to put the data into a more useable graphics form, and then transfers that graphical information (associated with the areas of the world) to the GPU. The simulation engine optimizing process then updates the shared variables to let graphics engine know it can draw scenery. The simulation engine optimizing process performs all the transformation and scenery loading in a separate scenery thread, and then makes it available to the graphics thread when the graphics thread is ready to load the scenery.

Figure 9B:
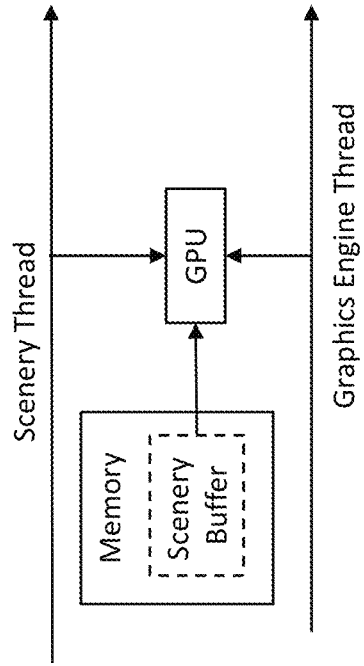
FIG. 9B is a diagram of a scenery thread using a GPU to compose a texture and instructing graphics engine thread to draw the scenery textures using the GPU according to the methods disclosed herein.

In an example embodiment, an active copy of a scenery buffer (i.e., sceneries, textures, triangles, copies of scenery components, geometry data, etc.) is maintained on the GPU (as seen in FIG. 9B). That active copy of the scenery buffer is the copy that is currently being used to draw the scenery graphics. In an example embodiment, the scenery thread allocates new memory on the GPU as the scenery graphics are being loaded. Once the scenery thread has finished loading the scenery graphics, the scenery thread passes the scenery graphics to the graphics engine thread. In an example embodiment, the scenery thread may have to wait for the graphics thread to be in between loading a complete frame of, for example, the reality environment, so that the graphics thread can load the scenery graphics.

In another example embodiment, to avoid a scenario where the scenery thread would have to wait for the graphics thread to finish drawing, the simulation engine optimizing process maintains three copies of the scenery buffer, generally shown in FIGS. 10A-10B, 11A-11C. The graphics thread reads from one copy of the scenery buffer. The scenery thread can write to either one of the other two copies of the scenery buffer. There is one copy of the scenery buffer that was just written to, and one copy of the scenery buffer that is currently being written to. When the graphics thread wants to draw, it looks for the most recent copy of the scenery buffer, and reads from that copy of the scenery buffer. Thus, the graphics thread obtains the freshest update from scenery thread without having to wait for the scenery thread to finish writing to a copy of the scenery buffer. The scenery thread, whenever it finishes writing to a copy of the scenery buffer, looks for the other two copies of scenery buffer (that the graphics isn't currently reading from) to write to one of those copies of scenery buffer. Thus, the scenery thread and the graphics thread never have to wait for the other thread to finish reading from or writing to a copy of the scenery buffer because there's always a different copy of the scenery buffer available to read from or write to.

Figure 10B:
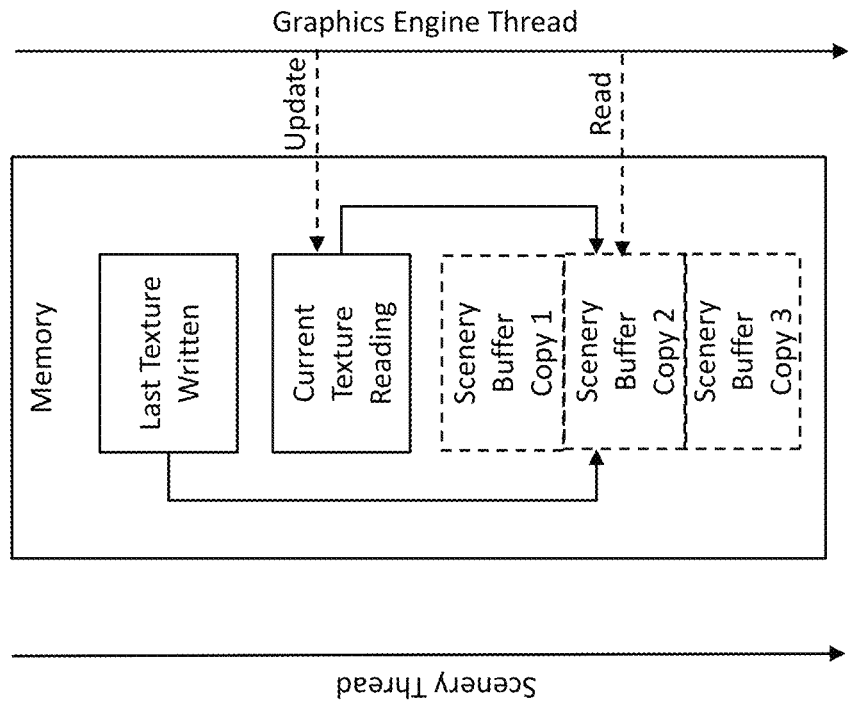
FIGS. 10A-10B are diagrams of a method of using a triple buffer technique to draw scenery textures according to the method disclosed herein.
Figure 10A:
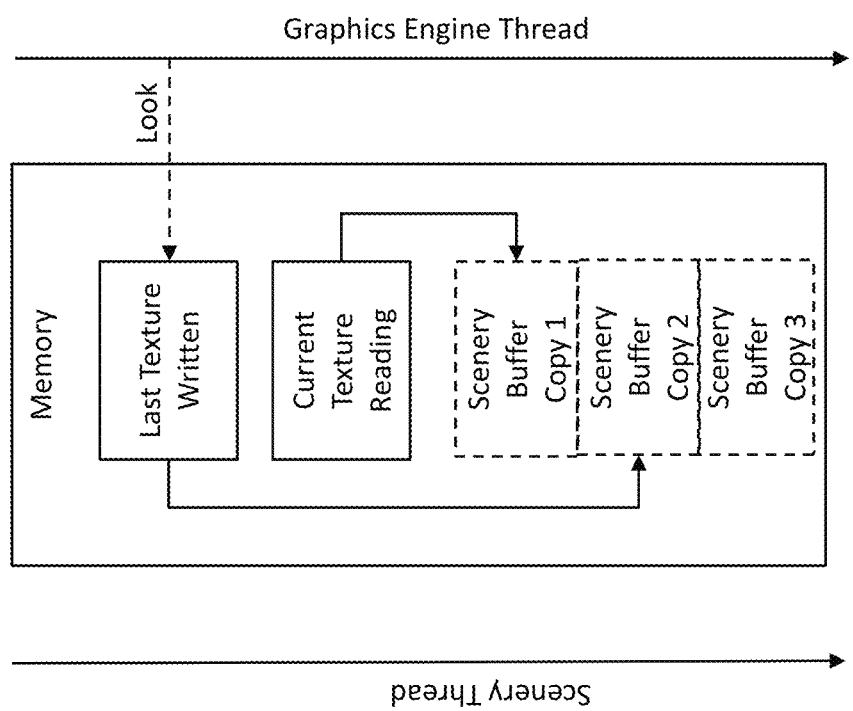
Figure 11B:
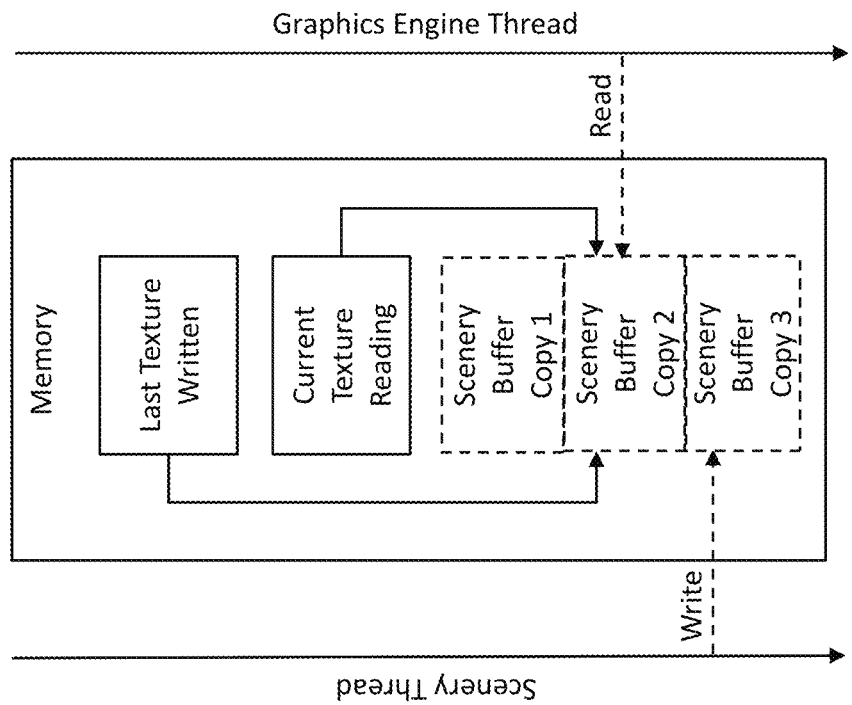
FIGS. 11A-11C are diagrams of a method of using a triple buffer technique to update scenery textures according to the methods disclosed herein.
Figure 11A:
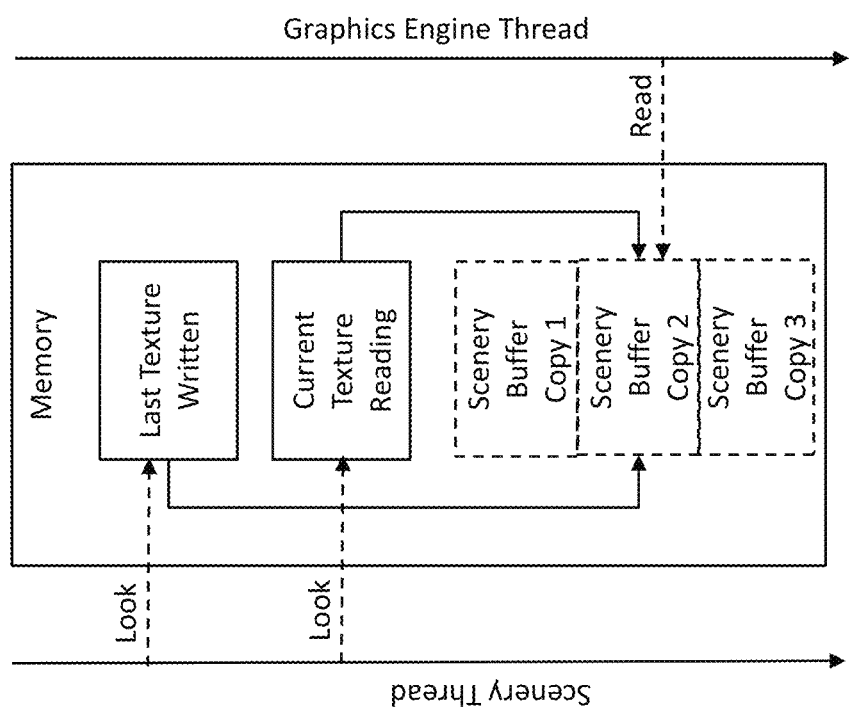
Figure 11C:
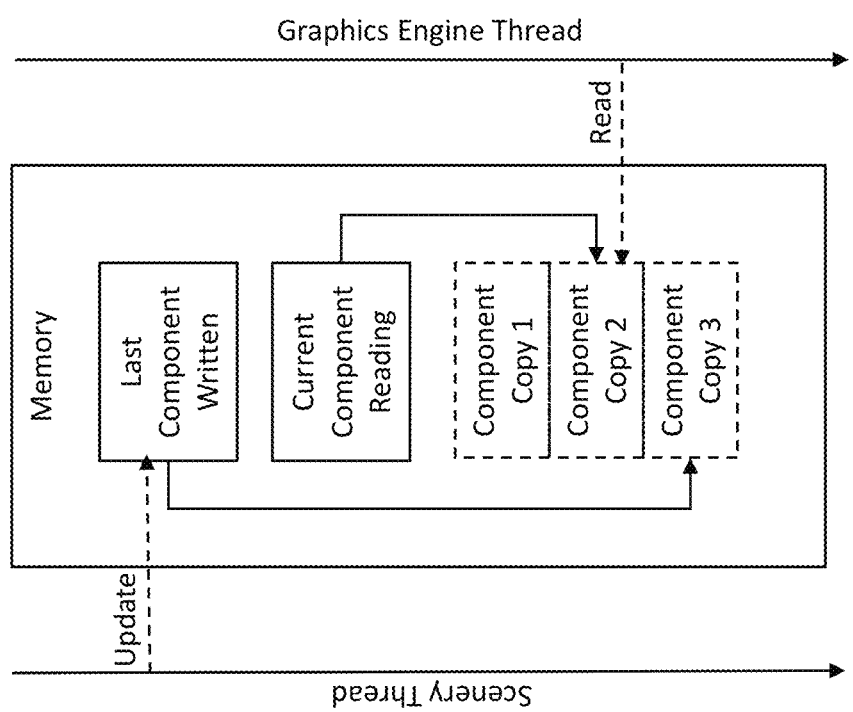

In an example embodiment, to keep all three copies of the scenery buffer in sync, there are two variables; LastTextureWritten and CurrentTextureReading. Whenever the graphics thread is requesting a new copy of the scenery buffer, it looks for the copy of the scenery buffer associated with the LastTextureWritten variable (as shown in FIG. 10A). The copy of the scenery buffer associated with the LastTextureWritten variable is then associated with the CurrentTextureReading variable, and the graphics thread reads from the copy of the scenery buffer associated with the CurrentTextureReading variable (as shown in FIG. 10B). The three copies of the scenery buffer are the last written scenery buffer, the scenery buffer that's currently being read, and the scenery buffer that was most recently read from. When the scenery thread needs to choose a copy of the scenery buffer to write to, it chooses whichever copy of the scenery buffer that is not associated with the LastTextureWritten variable, or the CurrentTextureReading variable (as shown in FIGS. 11A and 11B). Once the scenery thread writes to that third remaining copy of the scenery buffer, that copy of the texture becomes associated with the LastTextureWritten variable (as shown in FIG. 11C).

Figure 12:
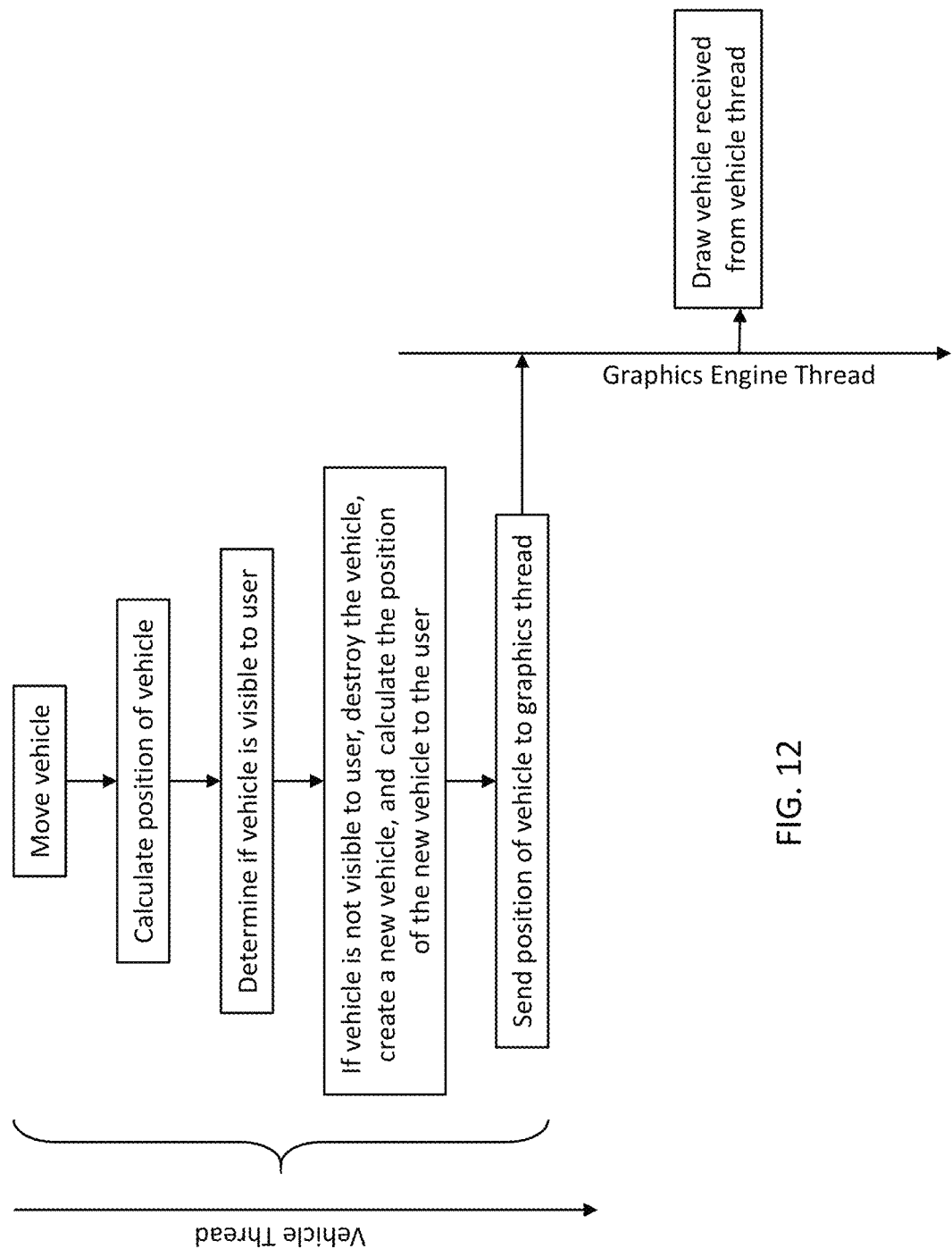
FIG. 12 is a flowchart of a method of calculating and updating vehicle positions in a simulated environment using multiple thread according to the methods disclosed herein.

In an example embodiment, the simulation engine optimizing process also maintains a vehicle traffic thread for reality application environments that display vehicles (often, many, many vehicles) driving on the road. It is desirable that the vehicles appear to be moving. In an example embodiment, depending on the virtual reality and/or gaming application, the movement of the vehicles may be less important than other details associated with the virtual reality and/or gaming application (for example, flight details in a flight simulation virtual reality application might be more important than how realistically the vehicles move on the ground below the flight simulator). At the same time, a less important aspect of the virtual reality and/or gaming application (like vehicles moving) should not take processing resources away from, and slow down, a more important aspect (like the flight details in a cockpit). In an example embodiment, the vehicle traffic thread maintains the simulation of vehicles at its own rate. In an example embodiment, shown generally at FIG. 12, the vehicle traffic thread moves the vehicle a little bit, and then runs a calculation to determine the position of the vehicle. If the vehicle is now positioned too far away for the user to see, the vehicle traffic thread destroys the vehicle (for example, because it is a waste of resources), and creates a new vehicle closer to the user's vantage point. In each frame, the graphics thread draws the vehicles that it most recently received from vehicle traffic thread, using a similar technique to triple buffering. When the simulation engine optimizing process computes the position of all vehicles, the result is list of, for example, 100,000 positions; one position for each vehicle. The simulation engine optimizing process transfers those positions to the graphics card so that graphics thread can draw the vehicles in the 100,000 different positions. The simulation engine optimizing process maintains three positions per vehicle on the graphics card. The graphics thread only draws the most recently updated vehicles that the graphics thread has access to. In an example embodiment, the simulation engine optimizing process maintains 3 positions for each vehicle on the graphics card. The graphics thread only draws the most recently updated vehicles it has access to.

Figure 13:
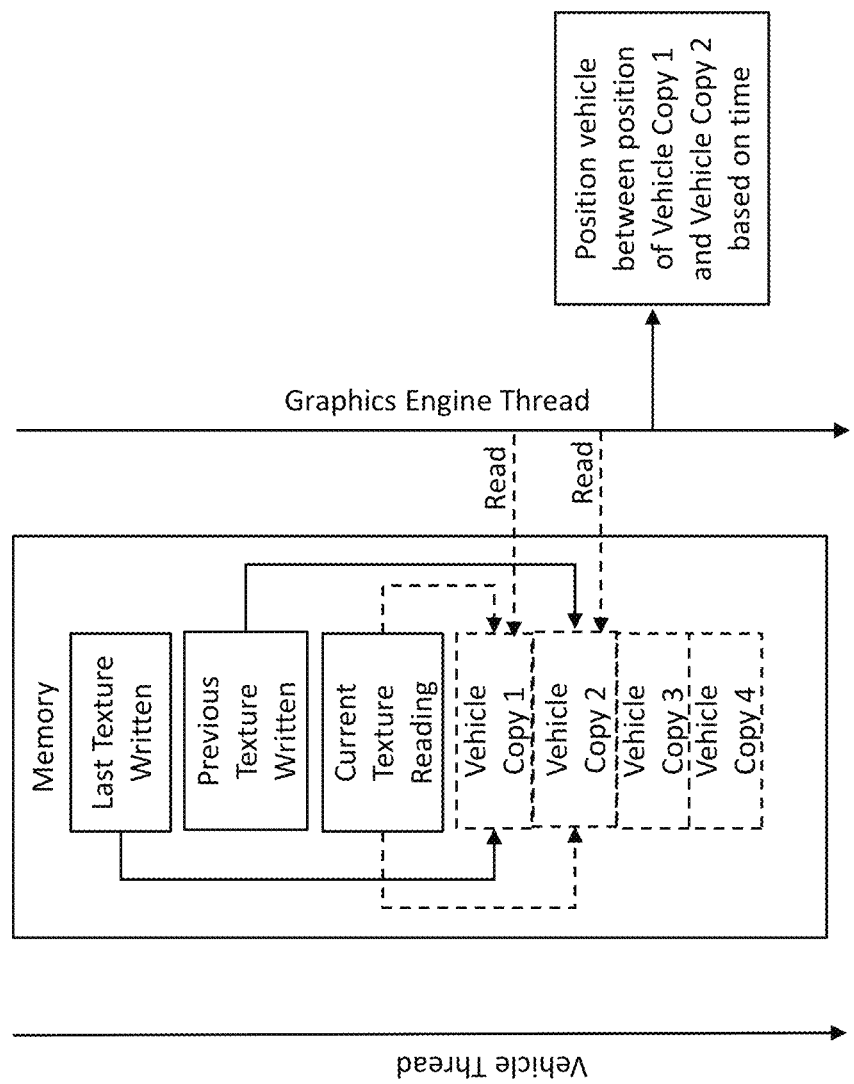
FIG. 13 is a diagram of a method of using a quadruple buffer technique to update vehicle positions according to the methods disclosed herein.

When the vehicles are updated only 5 times per second, the vehicles may appear "jumpy" even though the graphics engine is running smoothly. In an example embodiment, the simulation engine optimizing process maintains a fourth buffer (to an existing three buffers), shown in FIG. 13. The simulation engine optimizing process takes into account the two most recent vehicle positions when drawing the vehicle on the graphics card. The simulation engine optimizing process smoothly positions the vehicle in between the two most recently written vehicle positions (based on time). Thus, the vehicles animate smoothly even if they are being updated at a non-smooth rate.

In an example embodiment, if a user clicks on switch in the cockpit, the user click is handled within a background thread that captures the "click" action and also the direction in which the user was looking at the time of the "click" action (i.e., the direction of the user's head). The simulation engine optimizing process allows the slower background thread to handle background actions. When the user clicks on a switch in, for example, the cockpit, a ray is cast from the mouse and the switch with which it intersects. It may take 1 millisecond to run a computation. A system running 90 frames/second may require 11 milliseconds to draw the graphics. If an extra millisecond is required for running the mouse computations, one of the frames might be missed and the result is "jerky" animation within the virtual reality environment. Instead, in an example embodiment, the simulation engine optimizing process handles the click event in parallel with the other sub components that create the virtual reality environment. Thus, the component in the aircraft that the user clicked on might react one frame slower, but that is less noticeable than if the entire graphics updated one frame slower. In other words, the user's brain would detect the lack of smoothness from frame to frame if the entire virtual reality environment reacted one frame slower, but the user's brain is less likely to detect that the user clicked on a switch, and had to wait an extra $50^{th}$ of a second for the virtual reality application to react to that user's action. There's no interruption in smooth motion; rather there's simply a latency until another event occurs.

In an example embodiment, the simulation engine optimizing process makes more efficient use of the graphics card. When the graphics card is being utilized at 100%, the virtual reality and/or gaming application can get the most graphics capacity out of it. Graphics card may be able to draw 20 million triangles 60 times/second. As noted above, typically, the main virtual reality program is run on the CPU, and the CPU is used to instruct the graphics card when and what to draw. A CPU may instruct a graphics card to draw, for example, a tree using 5 triangles. If the CPU sends 100,000 commands to draw trees in multiple locations, this effort will take up processing capacity on the CPU, and slow down the overall virtual reality environment. Time is wasted by the CPU building these commands to send to the graphics card. At the same time, the graphics card takes time to spin up, and respond when it receives a command (or a set of commands). This combination is inefficient, and the CPU capacity may reach its limit at a few thousand trees. In an example embodiment, the simulation engine optimizing process has a triangle mesh that is a set of 100,000 trees made up of 500,000 triangles. The graphics engine thread on the CPU sends 1 command to the graphics card, and the graphics card spins up once to create/draw all of the trees in the triangle mesh. Thus, the process of creating the set of 100,000 trees is performed quickly.

Figure 14A:
FIG. 14A is an image of a mesh of trees formed according to methods disclosed herein.
Figure 14B:
FIG. 14B is an image of combined meshes of trees, building walls, and building roofs according to methods disclosed herein.
Figure 14C:
FIG. 14C is an image of combined meshes of trees, building walls, building roofs, land, water, and land/water boundaries according to methods disclosed herein.
Figure 15:
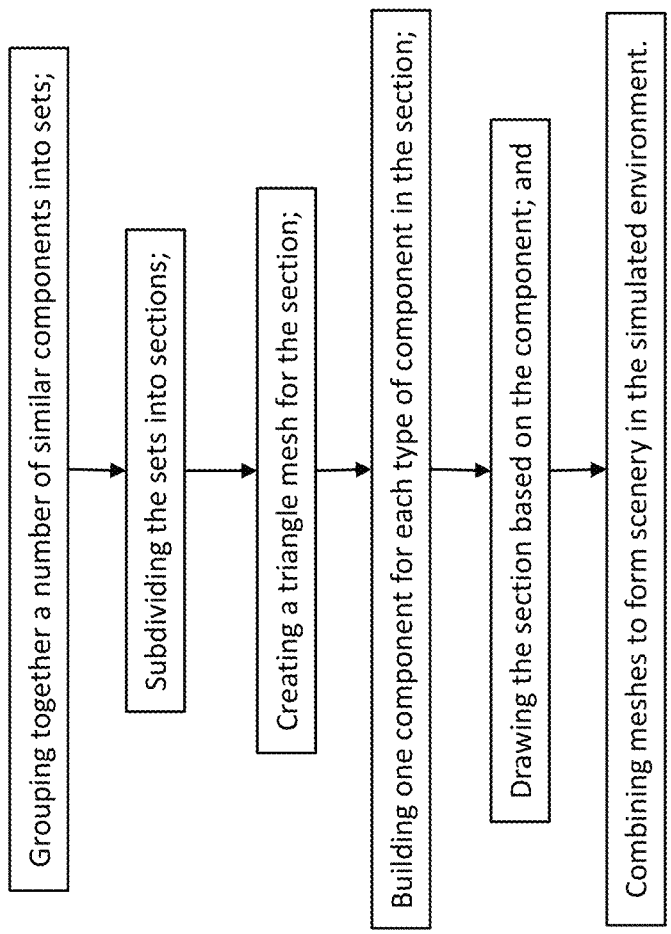
FIG. 15 is a flowchart of a method of optimizing processing in s a simulation engine of scenery by grouping similar components and subdividing the groups into smaller set and sections according to methods disclosed herein.

Typically, when creating background/scenery for virtual reality applications, objects are grouped together and those groups are treated independently. This approach can slow down the CPU. In an example embodiment, the simulation engine optimizing process groups objects into extremely large sets, as shown in FIG. 15. For example, an entire virtual reality world is split into, for example, 7×7 mile sections of scenery. Each section is a fairly large space. In an example embodiment, for each section, the simulation engine optimizing process creates, for example, one triangle mesh for the landscape, one triangle mesh for all of the buildings, one triangle mesh for all of the trees, and a giant chunk of land. For instance, FIG. 14A shows a mesh of trees. In FIG. 14B, a combined image of a first mesh of trees, a second mesh of building walls, and a third mesh of building roofs. FIG. 14C shows a combined image where the landscape includes three meshes, one of land, one for water, and one for land/water boundaries, in addition to the meshes of trees and buildings shown in FIGS. 14A and 14B. The simulation engine optimizing process builds one object for each type of object in the giant chunk of land. The end result is a few hundred draw commands. This allows the simulation engine optimizing process to maximize utilization of the graphics card by building large sets of triangles instead of small ones. In another example embodiment, the simulation engine optimizing process creates an object on the graphics card for a vehicle, and sends one list of buffer vehicle positions to the GPU. The simulation engine optimizing process then sends a single command to draw one vehicle 10,000 times using this position list. Thus, the simulation engine optimizing process is able to keep many objects moving without slowing down the virtual reality application.

Figure 16:
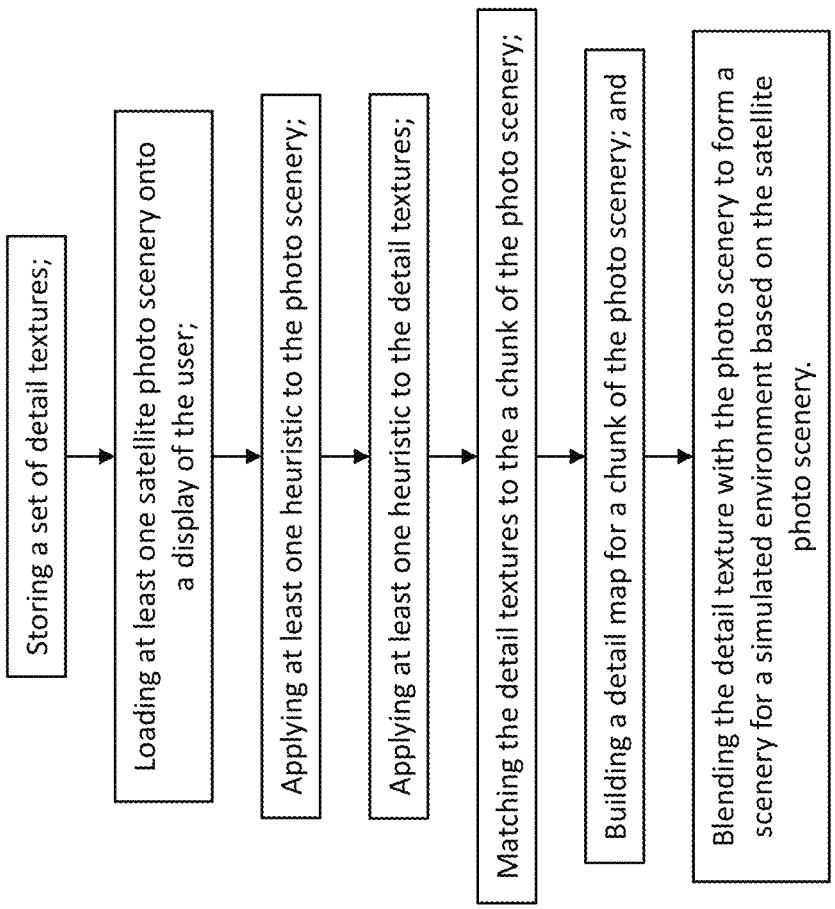
FIG. 16 is a flowchart of a method of optimizing processing in a simulation engine of scenery based on satellite imagery according to methods disclosed herein.

Typically, virtual reality applications, such as flight simulators, and even gaming applications, contain scenery for large portions of the entire world, if not the entire world. It can be impractical to store highly detailed information for such large areas since the dataset would be too large to fit on most home computers, take too long to download, cost too much to distribute, etc. In an example embodiment, the simulation engine optimizing process stores satellite photo scenery for the world as shown in FIG. 16. The simulation engine optimizing process also stores a set of detail textures (for example, gravel, grass, crops, sand, rocks, etc.). During the execution of the virtual reality and/or gaming application, as satellite photo scenery is loaded for display to the user, at least one heuristic may be run against the photo scenery. This may be performed on a block basis (for example small groups of pixels) and/or on a per pixel basis. Scenery data may be determined, for example, an average color of a block, average brightness of a block, any variance of a block (i.e., solid brown color, an average brown color but with some green and some gray, etc.), any extremes of color, strength of edges within a block, any other block level heuristics, etc. At least one heuristic may be run against detail textures. For each block, the simulation engine optimizing process matches the best detail texture for that block of the photo scenery. The simulation engine optimizing process builds a detail map for a photo scenery chunk, where the detail texture is mapped to the photo scenery chunk. As the GPU draws the scenery, it blends the detail texture with the photo scenery. Thus, the buildings in the scenery are accurately placed (since the scenery is derived from satellite photos), and the photo scenery looks very realistic both from far away, and as the user moves closer to the ground within the virtual reality experience. As the user moves closer to the ground, the ground looks detailed due to the blended detail textures, rather than muddy.

Figure 17A:
FIG. 17A is an image of a sky rendered using a method to optimize processing time in a simulating engine according to methods disclosed herein.
Figure 17B:
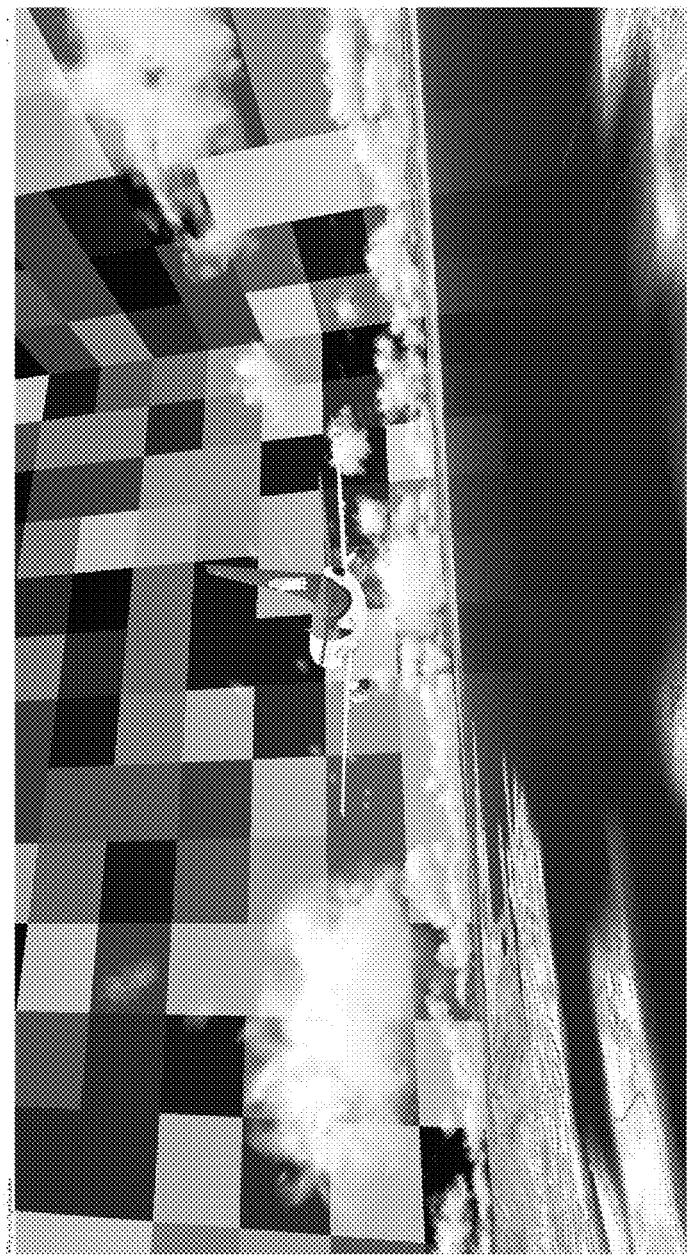
FIG. 17B is an exemplary image illustrating how the sky is subdivided into frames to optimize processing time in a simulating engine according to methods disclosed herein.
Figure 18:
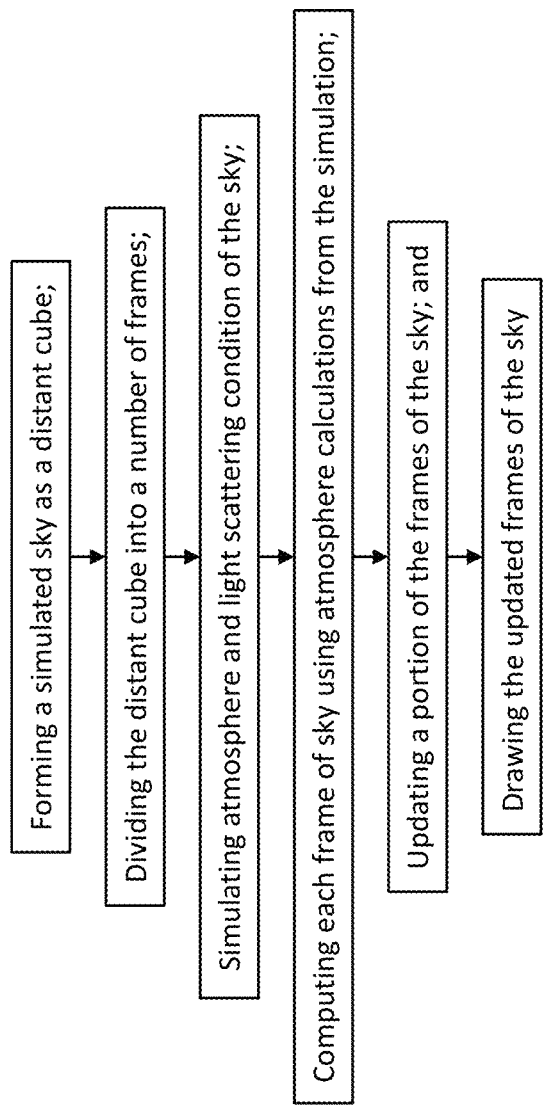
FIG. 18 is a flowchart of a method of drawing a sky in a simulated environment that optimizes processing time according to methods disclosed herein.

For components of the virtual reality and/or gaming application that are comprised of multiple smaller parts that move (for example, an airplane cockpit), it may not be feasible to send, for example, the cockpit as a single draw command to the GPU, as described above and shown in FIG. 15. For example, a switch may move relative to the panel on which the switch sits. Typically, virtual reality and/or gaming applications handle this problem by drawing each sub components of the larger component (for example, sending each piece of the cockpit to the GPU in a separate draw command). In an example embodiment, the simulation engine optimizing process separates the larger component into a few separate triangle meshes. Using the example of an airplane cockpit, there may be one triangle mesh for wool material on the seats, one triangle mesh for all of the plastic, including switches and dials, one triangle mesh for avionics and gauge displays, etc. In every mesh, to every triangle vertex, the simulation engine optimizing process attaches a number, for example this vertex is part of object 0, 1, 2, 3, etc. The simulation engine optimizing process maintains a list of positions and transformations for each object number, and then sends one draw command per object set. The benefit to adding this complexity to the calculation per vertex (and therefore making it slower) is a reduction (by an order of magnitude) in the number of commands sent to the GPU to draw a component. The processor cost of calculating the vertex is insignificant when compared to the processor cost of sending a command to the GPU to draw a component. Referring to FIGS. 17A-17B and 18, in an example embodiment, the simulation engine optimizing process draws the sky as a distant giant cube. FIG. 17A shows a completed image of the sky. FIG. 17B shows an exemplary image where each small frame (or chunk) of the sky is calculated at a time (using either atmospheric equations or artist driven data). Each frame is highlighted in a different color for clarity. Once all frames have been computed, the sky image as a whole is displayed. The cube has textures that determine the sky color surrounding the user. Referring to FIG. 18, a method of optimizing the process of drawing the sky is shown generally. In an example embodiment, the simulation engine optimizing process computes those textures on the graphics card by running a simulation of atmosphere and light scattering. The atmosphere calculations are very mathematical. Because of this, it may be impractical to perform the atmosphere calculations on the CPU. Instead, the simulation engine optimizing process performs the atmosphere calculations on the graphics card. In an example embodiment, to reduce the chance of overloading the GPU by performing the full atmosphere calculations in each frame, the simulation engine optimizing process draws a small portion of atmosphere texture in every frame of graphics simulation. In other words, if, within the reality environment, the user has an image of the sky in front of him/her, in every frame, the simulation engine optimizing process updates a small portion of the atmosphere. After about, for example, 100 frames, the simulation engine optimizing process has completely updated the image of the atmosphere. In an example embodiment, the simulation engine optimizing process uses a double buffer technique. In another example embodiment, a triple buffer technique may not be needed because the drawing of the atmosphere is not multi-threaded.

The techniques described above may be used for virtual reality, or on a desktop (for example, a gaming monitor), etc.

The techniques described above may be used for any type of actors in the virtual reality world and/or on a desktop application.

Those skilled in the art will appreciate that the conception, upon which this disclosure is based, may readily be utilized as a basis for designing other products without departing from the spirit and scope of the invention as defined by the appended claims. Therefore, the claims are not to be limited to the specific examples depicted herein. For example, the features of one example disclosed above can be used with the features of another example. Furthermore, various modifications and rearrangements of the parts may be made without departing from the spirit and scope of the underlying inventive concept. For example, the geometric configurations disclosed herein may be altered depending upon the application, as may the material selection for the components. Thus, the details of these components as set forth in the above-described examples, should not limit the scope of the claims.

Further, the purpose of the Abstract is to enable the U. S. Patent and Trademark Office, and the public generally, and especially the scientists, engineers and practitioners in the art who are not familiar with patent or legal terms or phraseology, to determine quickly from a cursory inspection the nature and essence of the technical disclosure of the application. The Abstract is neither intended to define the claims of the application nor is intended to be limiting on the claims in any way.

What is claimed is:

1. A method of optimizing a processing time of flight simulator engine that executes to create a simulated experience for a user, the method comprising:
identifying a plurality of components that comprise the simulated experience, wherein the simulated experience is rendered for the user in at least one of a virtual reality headset and a computer monitor;
separating the plurality of components into at least a first group of components representing graphics specific components and a second group of components comprising avionics components related to avionics and/or aerodynamics of a plane being simulated by the flight simulator;
assigning execution of the first group of components to a first thread;
assigning execution of the second group of components to a second thread to reduce a processing load of the first thread; wherein the
executing the first and second thread in parallel on a central processing unit (CPU) to create the simulated experience, wherein the first thread is executed with a higher speed and/or priority than the second thread; and
generating, by the first thread, graphics commands for a Graphics Processing Unit (GPU) to maximize utilization of the GPU.

2. The method of claim 1, further comprising:
buffering at least two copies of a component of the plurality of components to be executed by the first and second threads for rendering the simulated experience, respectively;
recording a status which component of the at least two copies of the component was last written to; and
recording a status of which component of the at least two copies of the component is currently being read from.

3. The method of claim 2, further comprising:
synchronizing the read and write access to the at least two copies of the component by the first and second threads wherein the at least two threads access different copies of the at least two copies of the component at any one time.

4. The method of claim 2, further comprising:
changing a status of the last written component after the at least two threads completes a write access operation on one of the at least two copies of the component.

5. The method of claim 2, further comprising:
changing a status of the component being currently read from when one of the first or second threads begins a read access operation on one of the at least two copies of the component.

6. The method of claim 2, wherein the step of buffering at least two copies of the component comprises buffering three copies of the component of the plurality of components.

7. The method of claim 2, wherein the step of buffering at least two copies of the component comprises buffering four copies of the component of the plurality of components.

8. The method of claim 1, wherein the component comprises textures, sceneries, triangles, and geometry data.

9. The method of claim 1, wherein the plurality of components is selected from the groups consisting of avionics, scenery, vehicles, cockpit, gauges.

10. The method of claim 1, further comprising executing a third group of components in a third thread, wherein the third group of components is selected from the group consisting of: a group of graphics components, a group of avionics components, a group of scenery components, and a group of vehicle components.

11. A computer program product optimizing a processing time of flight simulator engine that executes to create a simulated experience for a user, the computer program product comprising:
a non-transitory computer readable memory device having computer readable program code embodied therewith, the computer readable program code configured to:
identify a plurality of components that comprise the simulated experience, wherein the simulated experience is rendered for the user in at least one of a virtual reality headset and a computer monitor;
separate the plurality of components into at least a first group of components representing graphics specific components and a second group of components comprising avionics components related to avionics and/or aerodynamics of a plane being simulated by the flight simulator;
assign execution of the first group of components to a first thread;
assign execution of the second group of components to a second thread to reduce a processing load of the first thread;
execute the first and second thread in parallel on a central processing unit (CPU) to create the simulated experience, wherein the first thread is executed with a higher speed and/or priority than the second thread; and
generate, by the first thread, graphics commands for a Graphics Processing Unit (GPU) to maximize utilization of the GPU.

12. The computer program product of claim 11, wherein the computer readable program code is further configured to:
buffer at least two copies of a component of the plurality of components to be executed by the first and/or second threads for rendering the simulated experience, respectively;
record a status which component of the at least two copies of the component was last written to; and
record a status of which component of the at least two copies of the component is currently being read from.

13. The computer program product of claim 12, wherein the computer readable program code is
further configured to:
synchronize the read and write access to the at least two copies of the component by the first and second threads wherein the first and second threads each access different copies of the at least two copies of the component at any one time.

14. The computer program product of claim 12, wherein the computer readable program code is further configured to:
change a status of the last written component after the first and second threads completes a write access operation on one of the at least two copies of the component.

15. The computer program product of claim 11, wherein the computer readable program code is further configured to:
change a status of the component being currently read from when one of the first and second threads begins a read access operation on one of the at least two copies of the component.

16. A system for executing a flight simulator comprising:
a Central Processing Unit (CPU);
a Graphics Processing Unit (GPU); and
a non-transitory computer readable memory device, having computer readable program code embodied therewith, the computer readable program code configured to:
identify a plurality of components that comprise the simulated experience, wherein the simulated experience is rendered for the user in at least one of a virtual reality headset and a computer monitor;
separate the plurality of components into at least a first group of components representing graphics specific components and a second group of components comprising avionics components related to avionics and/or aerodynamics of a plane being simulated by the flight simulator;
assign execution of the first group of components to a first thread;
assign execution of the second group of components to a second thread to reduce a processing load of the first thread;
execute the first and second thread in parallel on a central processing unit (CPU) to create the simulated experience, wherein the first thread is executed with a higher speed and/or priority than the second thread; and
generate, by the first thread, graphics commands for a Graphics Processing Unit (GPU) to maximize utilization of the GPU.

17. The system of claim 16, wherein the computer readable program code is further configured to:
buffer at least two copies of a component of the plurality of components to be executed by the first and/or second threads for rendering the simulated experience, respectively;
record a status which component of the at least two copies of the component was last written to; and
record a status of which component of the at least two copies of the component is currently being read from.

18. The system of claim 17, wherein the computer readable program code is further configured to:
synchronize the read and write access to the at least two copies of the component by the first and second threads wherein the first and second threads each access different copies of the at least two copies of the component at any one time.

19. The system of claim 17, wherein the computer readable program code is further configured to:
change a status of the last written component after the first and second threads completes a write access operation on one of the at least two copies of the component.

20. The system of claim 16, wherein the computer readable program code is further configured to:
change a status of the component being currently read from when one of the first and second threads begins a read access operation on one of the at least two copies of the component.

* * * * *